United States Patent Office 3,055,847
Patented Sept. 25, 1962

3,055,847
PREPARATION OF A FOAMED RESIN FROM ALKOXYARYLOXYALUMINUM COMPOUNDS
William G. Woods and Marlowe L. Iverson, Anaheim, Calif., assignors to United States Borax & Chemical Corporation, Los Angeles, Calif., a corporation of Nevada
No Drawing. Filed May 18, 1959, Ser. No. 813,644
1 Claim. (Cl. 260—2.5)

This invention relates as indicated to monomeric alkoxyaryloxyaluminum compounds and unique polymers made therefrom.

It is an object of this invention to provide new monomeric aluminum compounds.

It is another object of this invention to provide new polymeric aluminum compounds having unique characteristics.

Other objects will appear as the description proceeds.

To the accomplishment of the foregoing and related ends, said invention then comprises the features hereinafter fully described and particularly pointed out in the claim, the following description setting forth in detail certain illustrative embodiments of the invention, these being indicative, however, of but a few of the ways in which the principle of the invention may be employed.

Broadly stated, the present invention comprises as new compositons of matter alkoxydiaryloxyaluminum and dialkoxyaryloxyaluminum compounds having the general formula $$(RO)_nAl(OR')_{n'}$$

where R is a material selected from the group consisting of alkyl radicals having from 2–5 carbon atoms and R' is a material selected from the group consisting of phenyl and substituted phenyls, the substituents of said substituted phenyls selected from the class consisting of halogen, alkyl, aryl, alkaryl, aralkyl, alkoxy, and aryloxy, where $n$ and $n'$ are integers of from 1–2 when $n=2$, $n'=1$, and when $n=1$, $n'=2$.

It is to be understood that the above-mentioned alkyl radicals can be normal, secondary or tertiary.

Thus the compounds of the foregoing broadly stated paragraph can be exemplified by the compound diisopropoxyphenoxyaluminum,

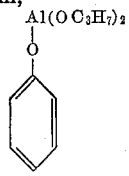

or by the compound diisopropoxy-2,6-di-t-butylphenoxyaluminum which has a substituted phenyl,

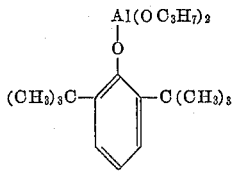

or by the compound isopropoxydiphenoxyaluminum,

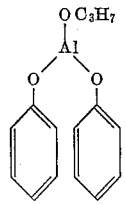

The compounds contemplated by the foregoing broadly stated paragraph are readily prepared by the reaction of an aluminum alkoxide and phenol or a substituted phenol under anhydrous conditions. The materials will be found to have a variety of uses. They are powerful desiccants; they can serve as an easy source of olefines; they have utility as paint driers and can be used as cross-linking agents with hydroxylic resins. We have additionally found that when the present dialkoxyaryloxyaluminum compounds are heated they undergo a rapid polymerization to form foamed resins, which have high thermal stability and are useful as insulation, and the present alkoxydiaryloxyaluminum compounds when heated readily form dimers.

Since the compounds contemplated by the present invention are all prepared by the same technique the present invention will be readily understood by the following examples:

I

To a solution of 100 g. (0.49 mole) of aluminum isopropoxide in 250 ml. of dry toluene was added 46.1 g. (0.49 mole) of dry phenol. Distillation through an efficient column gave 46.67 g. of toluene-isopropyl alcohol azeotrope, B.P. 81.5–82° C. Analysis by gas chromatography showed that 100.1% of the theoretical isopropyl alcohol had been evolved. Removal of the remaining solvent on a rotating evaporator at reduced pressure on a steam bath gave a clear, viscous syrup. This product, diisopropoxyphenoxyaluminum, was found to contain 11.40% Al (theory for $C_9H_{19}O_3Al$ is 11.33% Al).

The foregoing product when heated to 250–315° C. for about 30 minutes underwent a rapid polymerization reaction (with the release of propylene) and expanded into a foamed resin. This resin is soluble in toluene, benzene and similar solvents and will withstand temperatures up to about 400–500° C.

The following general polymeric structure is proposed for the foamed resins produced by heating the compounds of this invention:

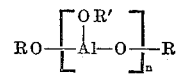

where R is an alkyl group of from 2–5 carbon atoms and R' is phenyl or substituted phenyl and where $n$ is an integer of at least 3. Thus in order to produce the foamed resins of the present invention it is necesary to heat a dialkoxyaryloxyaluminum compound so that at least three of the polymer-forming recurring units are linked together. By heating the alkoxydiaryloxyaluminum compounds of the present invention dimers are formed which range from viscous syrups to hard resins, but do not have the totally unexpected foamed characteristic.

II

A solution of 20.6 g. (0.10 mole) of 2,6-di-t-butylphenol in 100 ml. of toluene was boiled to remove water. To this was then added 20.4 g. (0.10 mole) of redistilled aluminum isopropoxide and 86 g. of liquid were slowly distilled from the reaction mixture. The residual solvent was distilled at water aspirator pressure. The residue was then distilled and collected. The resultant diisopropoxy-2,6-di-t-butylphenoxyaluminum was a clear, viscous syrup, B.P. 151° C. (0.09 mm.)–187° C. (0.76 mm).

III

To a boiling solution of 20.4 g. (0.10 mole) of redistilled aluminum isopropoxide in 150 ml. of toluene was slowly added a solution of 18.8 g. (0.20 mole) of dried phenol in 50 ml. of toluene. Distillate was continuously removed through a short Vigreaux column, analysis of the distillate by gas chromatography showed that 0.2 mole of isopropyl alcohol was evolved. The toluene solvent was then removed at reduced pressure on the steam bath. The resultant isopropoxydiphenoxyaluminum weighed 26.1 g. and was a hard, glassy product. The theoretical yield of isopropoxydiphenoxyaluminum may be calculated at 27.2 g.

While the foregoing examples illustrate the preparation of diisopropoxyphenoxyaluminum, diisopropoxy-2,6-di-t-butylphenoxyaluminum and isopropoxydiphenoxyaluminum, it is to be understood that by merely substituting another aluminum alkoxide having 2–5 carbon atoms the corresponding compound is just as readily prepared; or, if desired, any of the abovementioned substituted phenols can be used in place of the phenol.

Thus, using the foregoing technique such compounds as:
    Ethoxydiphenoxyaluminum
    Isopropoxydiphenoxyaluminum
    n-Butoxydiphenoxyaluminum
    Isopropoxy-di-para-chlorophenoxy-aluminum
    Diethoxyphenoxyaluminum
    Diisopropoxyphenoxyaluminum
    Diisopropoxy-2,6-di-t-butylphenoxyaluminum
    Di-n-butoxyphenoxyaluminum
    Di-t-butoxyphenoxyaluminum
    Di-n-pentoxyphenoxyaluminum
    Di-sec-pentoxyphenoxyaluminum
    Di-t-pentoxyphenoxyaluminum and various others can all be readily prepared.

Other modes of applying the principle of the invention may be employed, change being made as regards the details described, provided the features stated in any of the following claims or the equivalent of such be employed.

The novel alkoxyaryloxyaluminum compounds and the method of producing them are disclosed and claimed in our co-pending United States application, Serial Number 197,294, filed May 24, 1962.

We, therefore, point out and claim as our invention:

The method of producing a foamed resin wherein the recurring unit is

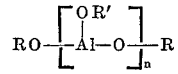

which comprises heating at a temperature of from about 200–400° C. a compound of the formula $(RO)_2Al-OR'$ where R is an alkyl group of from 2–5 carbon atoms and R' is a material selected from the group consisting of phenyl and substituted phenyls, the substituents of said substituted phenyl selected from the class consisting of halogen, alkyl, aryl, alkaryl, aralkyl, alkoxy, and aryloxy, and $n$ is an integer of at least three.

References Cited in the file of this patent
UNITED STATES PATENTS

| | | |
|---|---|---|
| 2,835,688 | Le Suer | May 20, 1958 |
| 2,936,317 | Arnold et al. | May 10, 1960 |